United States Patent [19]
Strizki

[11] 3,866,367

[45] Feb. 18, 1975

[54] DEFORMABLE COUPLING

[75] Inventor: Richard A. Strizki, Ringoes, N.J.

[73] Assignee: The State of New Jersey, Trenton, N.J.

[22] Filed: Jan. 3, 1973

[21] Appl. No.: 320,725

Related U.S. Application Data

[63] Continuation-in-part of Ser. No. 151,285, June 9, 1971, abandoned.

[52] U.S. Cl............................ 52/98, 403/2, 248/1, 40/145 R
[51] Int. Cl............................................. E04b 1/00
[58] Field of Search......... 52/98, 99; 404/10; 403/2, 403/11; 40/145 R; 248/1

[56] References Cited
UNITED STATES PATENTS

| | | | |
|---|---|---|---|
| 2,877,170 | 3/1959 | Greenhalgh et al. | 188/1 C |
| 2,961,204 | 11/1960 | Rayfield et al. | 188/1 C X |
| 3,026,972 | 3/1962 | Hendry et al. | 188/1 C X |
| 3,392,599 | 7/1968 | White | 74/492 |
| 3,492,888 | 2/1970 | Nishimura et al. | 403/2 UX |
| 3,521,917 | 7/1970 | King | 403/2 |
| 3,574,376 | 4/1971 | Cummins | 52/758 F |
| 3,637,244 | 2/1972 | Striziki | 403/2 X |

*Primary Examiner*—William H. Schultz
*Attorney, Agent, or Firm*—Sperry and Zoda

[57] ABSTRACT

A deformable or destructable coupling designed to function as a shock absorbing device under overload conditions to relieve and/or progressively reduce forces applied to cables, tow lines, and other members which are relatively movable in a longitudinal direction upon the application of tension or compression thereto. The invention is particularly adapted for use with highway signs, utility poles, guard rails and the like which may be released or broken at the base by impact such as a collision while still being connected to or partially supported by lines or connections extending to other posts or supports.

4 Claims, 11 Drawing Figures

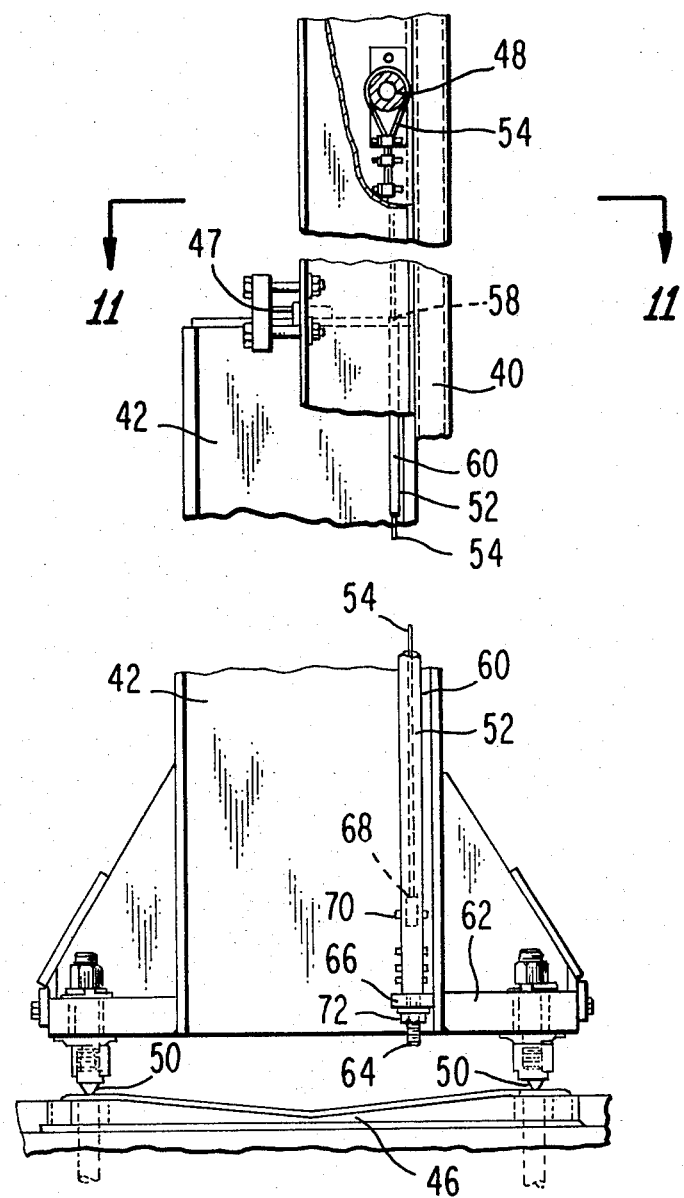

3,866,367

DEFORMABLE COUPLING

This application is a continuation in part of applicant's copending application, Ser. No. 151,285, filed June 9, 1971 now abandoned.

FIELD OF INVENTION

Wires, cables and tension members are customarily used to support or stabilize poles, posts, towers, signs and other installations along highways and elsewhere. Guard rails and road barriers frequently employ cables in such locations and there are of course many other situations as when towing barges or in providing shock absorbing assemblies, wherein tension, compression or inertia forces are sufficient to cause cables, rods or other members to be broken, strained or pulled from an anchorage or other connections or point to which they are secured. Moreover, when one of a pair or series of posts to which a sign, power line or the like are connected is broken or overloaded a whole structure or assembly may be torn loose or be caused to whip around so as to cause further and extensive damage.

Thus, for example, "break-away supports" for highway signs constructed in accordance with applicant's U.S. Pat. No. 3,637,244 frequently utilize two or more posts or columns and may advantageously be stabilized by means of cables, wires or the like. However, when such a post or column breaks away from its foundation, other posts, cables and structures associated therewith are subjected to sudden and excessive forces and may be broken, loosened or pulled away from their connections causing serious damage or personal injury.

THE PRESENT INVENTION

In accordance with the present invention, wires, cables and other members which may be subjected to excessive tension or loading, are provided with shock absorbing means in the nature of a deformable or destructable coupling embodying inter-engaging elements having a construction or physical properties such that one element will be deformed or progressively fail when subjected to force in excess of a predetermined value. The construction further is designed to permit such progressive or continuing deformation or failure to take place until the forces applied to the assembly have been dissipated or have fallen below a predetermined value it is designed to withstand.

In an elementary form of the invention a deformable element, which may be tubular in shape, is formed of aluminum or other relatively yieldable material, and adapted to be secured at one end to a stationary member or cable of the assembly to be protected. Another relatively movable cable or member of the coupling extends into the tubular element and has a pin or element carried thereby and projecting into a hole or opening in the tubular element so as to shear and deform the tubular element upon relative longitudinal movement of the elements. When such an assembly is subjected to loading exceeding predetermined values for which it is designed, relative movement of the pin serves to deform or shear the tubular element longitudinally. The assembly will then yield so as to serve as a shock absorber and such deformation of the tube will continue until the energy applied is dissipated or the forces to which the assembly is subjected fall below those required for further deformation of the tube.

THE DRAWINGS

FIG. 10 is an enlarged side elevation of a portion of the assembly shown in FIG. 8.

PREFERRED EMBODIMENT OF THE PRESENT INVENTION

Figure 1:
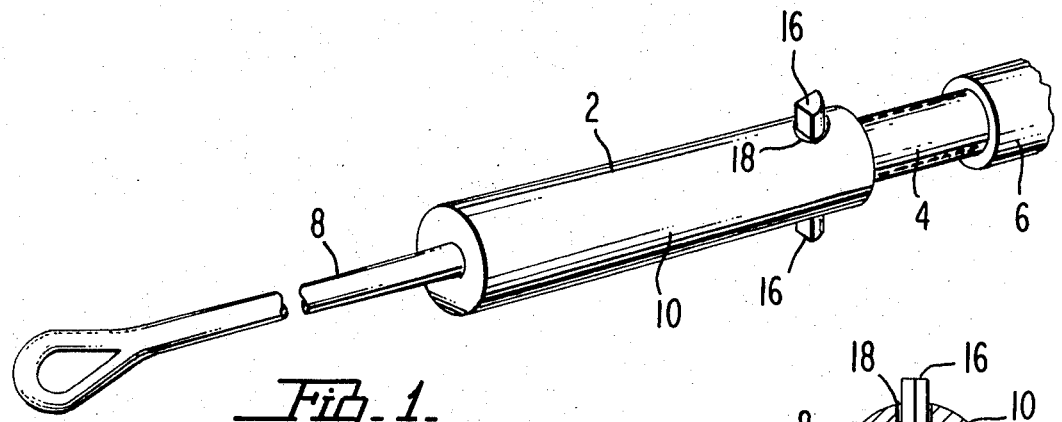
FIG. 1 is a perspective illustrating one typical embodiment of a destructable coupling embodying the present invention.
Figure 2:
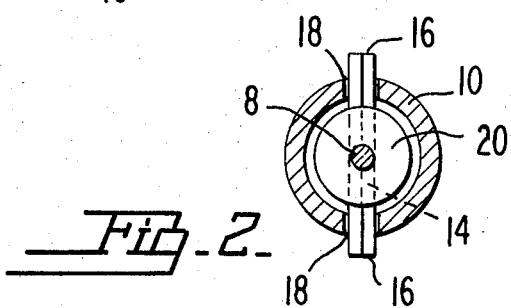
FIG. 2 is a transverse sectional view through the construction of FIG. 1.
Figure 3:
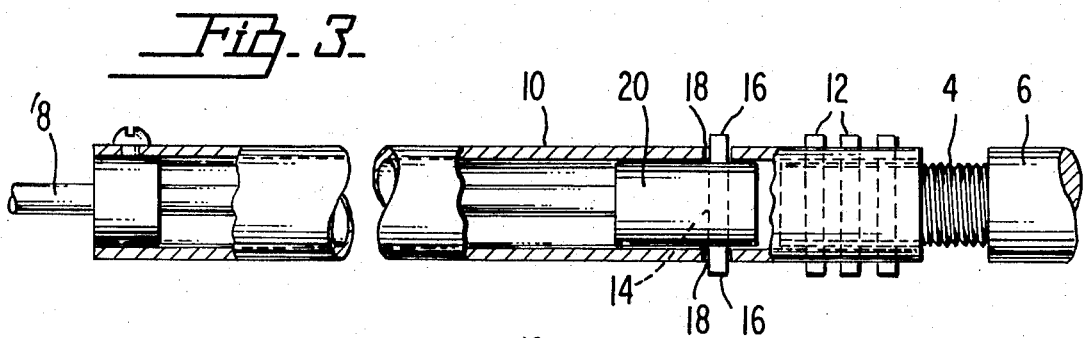
FIG. 3 is a longitudinal sectional view of the assembly shown in FIGS. 1 and 2.

In the simplified form of the invention chosen for purposes of illustration in FIGS. 1 to 4, the coupling 2 is connected between a member 4, such as a bolt or the like secured to an anchor 6 or other stationary member, and a member 8 such as a cable to which tension may be applied. The coupling 2 embodies a deformable element 10 which may be tubular in shape and is secured to the stationary bolt 4 by means of pins or other fasteners 12. A second element 14 is connected to the cable or member 8 for movement longitudinally with respect to the tubular element upon the application of predetermined tension to the member 8. As shown, the second element 14 may be in the form of a pin extending diametrically with respect to the tube 10 and having the opposite ends 16 thereof extending into opening 18 in the tube. For this purpose the pin 14 is carried by a cylindrical head 20 slidably movable within the tube 10 and fixedly attached to the tension applying cable 8.

Figure 4:
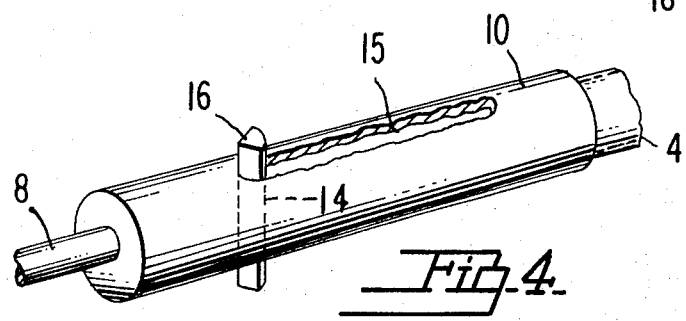
FIG. 4 is a perspective illustrating the device of FIGS. 1, 2 and 3, after it has been subjected to overload.

Upon the application of sufficient tension to the cable 8, the pin 14 connected thereto will be caused to move lengthwise in the tube 10, and in so moving the pin will shear and deform the tube substantially as shown at 15 in FIG. 4. Such relative movement and shearing of the tube 10 by the pin 14, of course, will not take place until the forces applied to the relatively movable elements exceed a predetermined value for which the coupling or connector has been designed. Thereafter, such deformation will continue progressively until the tension applied to the relatively movable elements has been relieved or fallen below the predetermined value so that further deformation of the tubular element no longer takes place.

Figure 5:
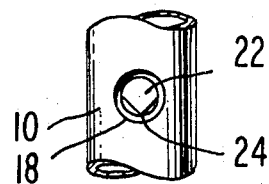
FIGS. 5 and 6 illustrate typical pins which may be used in the assemblies of FIGS. 1 to 4.
Figure 6:
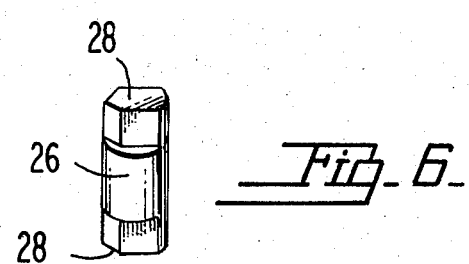

The sension or force required to initiate the deformation of the tubular element 10 will depend upon the physical properties and/or shape and dimensions of the tubular element and the pin 14. Thus, as shown in FIG. 5 the pin 22 may be provided with a deforming or cutting edge 24 which faces toward the cable 8 with which it will move upon the application of tension to the cable by which it is moved. In the alternative, as shown in FIG. 6, the pin 26 may be used and provided with end portions 28 which are of less width than the body of the pin and located in a plane extending longitudinally of the tubular element with which it is to be associated.

Figure 7:
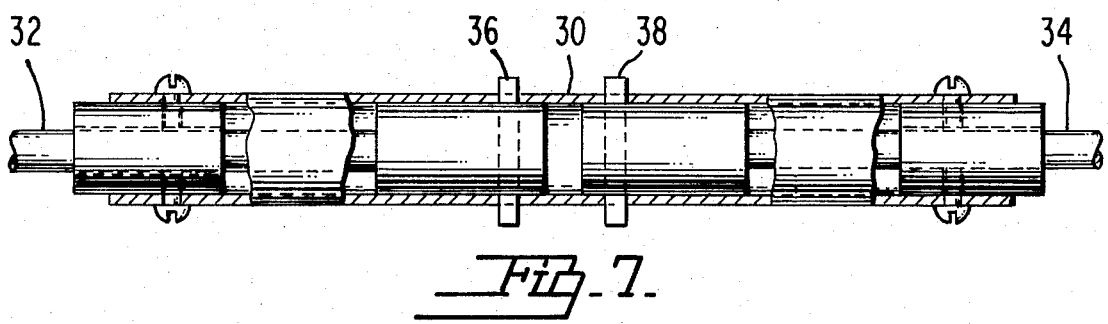
FIG. 7 is a longitudinal sectional view of an alternative form of the invention.
Figure 8:
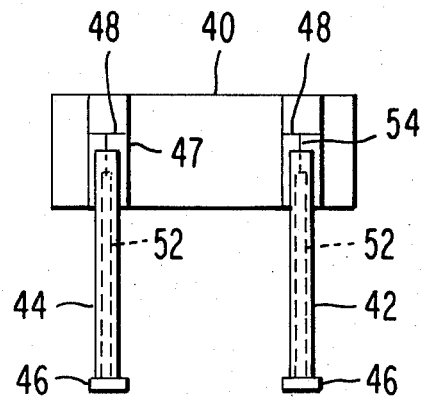
FIG. 8 is a rear elevational view of a typical highway sign to which the present invention may be applied.

If desired destructable couplings embodying the present invention may be provided with multiple elements for resisting relative longitudinal movement of members such as the opposite ends of wires, cables or the like while permitting controlled movement thereof under overload conditions. Therefore, as shown in FIG. 7 a tubular element 30 may receive the opposite ends of two relatively movable members 32 and 34. The member 32 has a pin or deforming element 38 carried thereby. These pins may be located in the same plane as shown in FIG. 7 or at right angles to each other if desired. In either case the application of excessive tension or overload to the members 32 and 34 will cause one or both of the deforming elements 36 and 38 to move longitudinally with respect to the tubular element 30 to deform the tube while dissipating or relieving the forces applied to the cable or members to which the coupling is connected.

The constructions shown in FIGS. 1 to 7 are of general application and may be employed in substantially any situation wherein tension or compression forces will be applied to members that are relatively movable longitudinally with respect to each other or in other locations wherein overloading in excess of a predetermined minimum may be encountered or need be controlled.

Other assemblies in which the present shock absorbers or overload relieving devices are of importance are exemplified by highway signs, utility poles and guard rails, wherein a post or pole may be broken away from its support by impact or collision near the base of the pole while the upper portion of the pole remains connected and at least partially supported by members or lines attached to other poles or supports adjacent thereto. Constructions of this type are illustrated in FIGS. 8 to 11 wherein a sign panel 40 is supported by two vertical posts 42 and 44 each of which is mounted on a foundation 46 adjacent the ground while the upper portions of the posts are connected to the sign panel at 47. The mounting means on the foundations 46 of posts 42 and 44 preferably include a breakaway connection 50 of the type disclosed in applicant's U.S. Pat. No. 3,637,244. Such a connection is operable upon the application of impact or other excessive force near the lower portion of the post to yield readily so as to result in minimum damage to a vehicle and its occupants. Under such circumstances and as shown by the position of the post 42 in phantom lines in FIG. 9, when post 42 has broken away from its foundation 46, the lower end of the post will be free to move with the vehicle and if not restrained would itself cause further damage as it becomes a missile striking the windshield or other portions of the vehicle and objects adjacent thereto. Moreover, the forces transmitted to the sign panel 40 and the other post in the assembly may be so great as to cause further and extensive damage to the entire construction.

In accordance with the present invention such overload and destruction is relieved or reduced by providing a shock absorbing coupling between the post 42 and the sign panel 40 or other members of the assembly. Thus as shown in FIG. 10 a shock absorbing coupling 52 is located adjacent and parallel to the post 42 and is provided at its upper end with a wire or cable 54 which passes about a cross bar 48 or other fixed member mounted on the sign panel 40 above the upper end of the posts 42. Cable 54 passes downward from the fixed member 48 through a guide positioning block 58 secured to the upper end of the post 42. The positioning block 58 is engaged by the upper end of the tubular deformable element 60 of the shock absorbing coupling 52 and serves to prevent horizontal displacement of the element 60 with respect to the post. The tubular element preferably extends downward to the lower end of the post 42 where it is anchored to the base 62 of the post 42 by a bolt 64 bearing against an anchor block 66 welded to the base 62 of the post. The deformable element 60 of the coupling 52 is thus fixedly secured to the post so as to be movable therewith. The lower end of the cable 54 has a head 68 carried thereby and slidable longitudinal within the tubular element 60. A cross pin 70 mounted in the slidable head 68 extends radially through openings in the tubular element so as to hold the cable 54 and tubular element in a normal unstressed relation.

Figure 9:
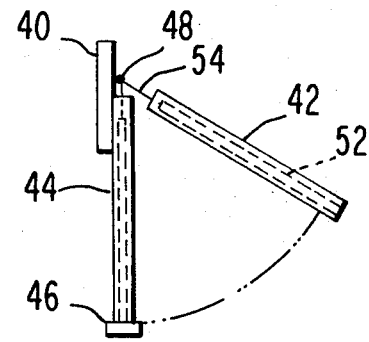
FIG. 9 is a diagrammatic side elevation of the sign illustrated om FIG. 8.
Figure 11:
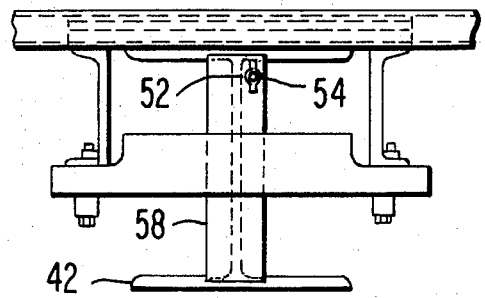
FIG. 11 is a horizontal sectional view of the construction shown in FIG. 11 taken on line 11—11 thereof.

With this construction, an impact or other force which serves to rupture the break-away connection 50 between the base 62 of the post 42 and its foundation 46, will cause the lower end of the post 42 to move to a position such as that indicated by the phantom lines in FIG. 9 while the upper end of the post will be held against free movement and be restrained by its connection to the sign panel 40 and the other post 44. The weight of the post 42 and the inertia forces applied thereto will then be applied in turn to the shock absorbing coupling 52. Therefore, the base 62 of the post will act through bolt 64 and anchor block 66 to apply tension to the shock absorbing coupling whereby the post 42 will cause the tube 60 to move therewith while cable 54 and pin 70 are held against substantial movement by post 44, sign panel 40, and cross bar 48. As a result the deformable element 60 of the shock absorbing coupling 52 will move longitudinally with respect to cable 54 and pin or element 70. The tension thereby developed is transmitted to the sign structure and stationary members of the assembly through the shock absorbing coupling 52 and when that tension exceeds a predetermined value for which the shock absorber is designed, pin 70 will deform the tubular element 60 in a manner represented by FIG. 4 of the drawing.

The materials employed in forming the elements of the coupling can of course be varied and may be selected for use in each installation to provide the requisite strength for normal usage of the wire or cable without danger of failure thereof. However, when overload occurs — whether temporary or continued — the coupling will yield to relieve such overload and will continue to yield until the excessive loading ceases or the coupling is completely destroyed. In this connection the tubular element which is to be deformed may be of any desired length. Thus in actual practice, wire cables utilized to stabilize highway signs have been provided with tubular deformable elements varying in length from 8 to 25 feet. A 3/16 inch wire rope with a minimum breaking strength of 4700 pounds, a drawn aluminum tube ¾ inch in diameter and having a wall thickness of 0.083 inch was used. The tube was formed of an aluminum alloy identified as "6061-T6." The pin which deforms the tubular element was formed of steel ¼ inch in diameter and 1 inch in length and provided with a cutting edge as shown in FIG. 6. The coupling assembly thus provided served to assure connection of the post with the sign under all conditions wherein the tension or loading of the shock absorber was less than 2,000 pounds. However, upon impact of a vehicle with the post or the application of forces which placed the cables under a tension in excess of 2,000 pounds, deformation of the tubular element occurred and continued until the loading fell below 2,000 whereupon no further deformation took place.

It will be apparent that the values of the loading and/or overloading for which any particular coupling is designed and the material, configuration and dimensions of the elements employed to attain the desired control and operation thereof in any system or combination can be greatly varied. Moreover, the deformable element of the assembly need not be tubular in form and may embody various forms of longitudinally movable elements capable of connection to relatively movable members to be controlled. Thus the shock absorbing means included in the connection between the upper and lower portions of the post may be in the form of a spring, dashpot, torsion bar or the like if desired.

In view thereof it should be understood that the particular embodiments of the invention shown in the drawing and described above are intended to be illustrative only and are not intended to limit the following claims.

I claim:

1. An assembly embodying two horizontally spaced, vertically extending supports with a member extending therebetween and a shock absorber connected to said assembly to reduce the forces exerted upon said member upon relative movement of one of said supports with respect to said member, said shock absorber including two interengaging elements one of which is connected to said one of said supports and the other of which is connected to and movable by another member of said assembly, said interengaging elements being relatively movable and one of said elements being deformable by the other of said elements upon such relative movement.

2. An assembly as defined in claim 1 wherein one of said elements is tubular in shape and the other of said element is in the form of a pin extending radially with respect to said tubular element and into an opening in said tubular element.

3. An assembly including two horizontally spaced, vertically extending posts with a member connected to the upper portion of both posts, one of said posts being mounted on a support by means which are destructable upon impact of an object with said post, and shock absorbing means movable with the latter post upon destruction of said mounting means, said shock absorbing means including two interengaging elements one of which is deformable by the other upon relative movement thereof, and one of which elements is connected to said latter post, and the other of which elements is connected to said member.

4. The combination as defined in claim 3 wherein one of said elements is tubular in form and is movable with said one of said posts upon displacement thereof with respect to said support, and the other of said elements is in the form of a pin extending into an opening in the tubular element and is connected to said member by a cable.

* * * * *